（12）United States Patent
Kitsukawa et al.

(10) Patent No.: US 9,169,770 B2
(45) Date of Patent: Oct. 27, 2015

(54) ENGINE SYSTEM

(75) Inventors: Isao Kitsukawa, Fujisawa (JP);
Tomohiro Sugano, Fujisawa (JP);
Yoshiyuki Abe, Fujisawa (JP); Haruyo Kimura, Fujisawa (JP); Akira Iijima, Fujisawa (JP); Naoki Ishibashi, Fujisawa (JP); Syougo Sakashita, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 321 days.

(21) Appl. No.: 13/881,309

(22) PCT Filed: Oct. 24, 2011

(86) PCT No.: PCT/JP2011/074412
§ 371 (c)(1),
(2), (4) Date: Apr. 24, 2013

(87) PCT Pub. No.: WO2012/057066
PCT Pub. Date: May 3, 2012

(65) Prior Publication Data
US 2013/0213036 A1  Aug. 22, 2013

(30) Foreign Application Priority Data
Oct. 28, 2010  (JP) .................................. 2010-242531

(51) Int. Cl.
*F02B 33/44* (2006.01)
*F02B 37/04* (2006.01)
(Continued)

(52) U.S. Cl.
CPC ................ *F02B 37/04* (2013.01); *F02B 37/10* (2013.01); *F02B 39/10* (2013.01); *F02D 13/04* (2013.01);
(Continued)

(58) Field of Classification Search
CPC .......... F02B 37/10; F02B 39/10; F02B 37/04; F02D 13/04; F02D 23/00; F02D 41/0005; F02D 41/0007; Y02T 10/144; Y02T 10/42; F02M 25/0707; F02M 25/0713; F02M 25/0731
USPC ....................................... 60/607–609
See application file for complete search history.

(56) References Cited

U.S. PATENT DOCUMENTS 4,745,755 A * 5/1988 Kawamura ...................... 60/608
4,748,812 A * 6/1988 Okada et al. .................... 60/614
(Continued)

FOREIGN PATENT DOCUMENTS

JP     9-32569      2/1997
JP     09088619 A * 3/1997 .............. F02B 37/10
(Continued)

OTHER PUBLICATIONS

Written Opinion of the International Searching Authority mailed Jan. 17, 2013 in corresponding International Application No. PCT/JP2011/074412.
(Continued)

*Primary Examiner* — Thai Ba Trieu
(74) *Attorney, Agent, or Firm* — Staas & Halsey LLP

(57) ABSTRACT

An engine system for ensuring a sufficient boost pressure during engine braking and improving a braking force of a compression release brake. The system includes: a compression release brake device that operates a compression release brake to obtain a braking force during engine braking by forcibly opening an exhaust valve and releasing a compressive pressure near a compression top dead center of an engine; a power-assisted turbocharger including a turbine disposed on an exhaust passage of the engine and driven by exhaust, a compressor disposed on an intake passage and driven by a rotational torque of the turbine, and an electric motor that assists a drive force of the compressor; and an electric motor control unit that drives the electric motor when the compressor release brake is operated.

3 Claims, 2 Drawing Sheets

(51) Int. Cl.
*F02B 37/10* (2006.01)
*F02B 39/10* (2006.01)
*F02D 13/04* (2006.01)
*F02D 23/00* (2006.01)
*F02D 41/00* (2006.01)
*F02M 25/07* (2006.01)

(52) U.S. Cl.
CPC ............ *F02D 23/00* (2013.01); *F02D 41/0005* (2013.01); *F02D 41/0007* (2013.01); *F02M 25/0707* (2013.01); *F02M 25/0713* (2013.01); *F02M 25/0731* (2013.01); *Y02T 10/144* (2013.01); *Y02T 10/42* (2013.01)

(56) References Cited

U.S. PATENT DOCUMENTS

| | | | | |
|---|---|---|---|---|
| 4,774,811 A | * | 10/1988 | Kawamura | 60/608 |
| 5,076,059 A | * | 12/1991 | Okada | 60/608 |
| 5,133,188 A | * | 7/1992 | Okada | 60/609 |
| 5,881,559 A | * | 3/1999 | Kawamura | 60/608 |
| 6,922,997 B1 | * | 8/2005 | Larson et al. | 60/597 |
| 2005/0097888 A1 | * | 5/2005 | Miyashita | 60/602 |
| 2008/0121218 A1 | * | 5/2008 | Algrain | 60/605.1 |
| 2013/0213350 A1 | * | 8/2013 | Watanabe et al. | 123/327 |

FOREIGN PATENT DOCUMENTS

| | | | | |
|---|---|---|---|---|
| JP | 9-104259 | | 4/1997 | |
| JP | 2006-177171 | | 7/2006 | |
| JP | 2007-239655 | | 9/2007 | |
| JP | 2009156109 A | * | 7/2009 | ............. F02B 37/10 |
| JP | 2009-228448 | | 10/2009 | |
| JP | 2010-209735 | | 9/2010 | |

OTHER PUBLICATIONS

Seiichi Ibaraki et al., "Development of the "hybrid turbo," an electrically assisted turbocharger", Mitsubishi Heavy Industries, Ltd. Technical Review, vol. 43 No. 3, Sep. 2006, pp. 36-40.

International Search Report of PCT/JP2011/074412 mailed Jan. 17, 2012.

* cited by examiner

ENGINE SYSTEM

CROSS REFERENCE TO RELATED APPLICATIONS

This application claims the foreign priority benefit of Japanese Application No. 2010-242531 filed Oct. 28, 2010, the contents of which are incorporated herein by reference, which serves as priority for PCT Application No. JP2011/074412 filed Oct. 24, 2011.

TECHNICAL FIELD

The present invention relates to an engine system using a compression release brake that obtains a braking force during engine braking by forcibly opening an exhaust valve and releasing a compressive pressure near a compression top dead center of an engine.

BACKGROUND ART

Generally, when putting on the brake with a great frequency, such as on a downhill road, an engine brake is used in combination. However, in a large vehicle, such as a truck or a bus, the weight is originally heavy and the loading weight is applied. Hence, when the loading weight is heavy or the downhill road is steep, the effect of the engine brake may be inefficient.

Therefore, a compression release brake capable of obtaining a strong braking force during engine braking is supplementarily used. The compression release brake inhibits the generation of a force to push down a piston during an expansion stroke by forcibly opening an exhaust valve and releasing a compressive pressure near a compression top dead center of an engine, so that a braking force obtained during a compression process effectively acts.

Further, as citation list information related to the invention of this application, there are Patent Documents 1 to 4 and Non Patent Document 1.

PRIOR ART DOCUMENTS

Patent Document 1: JP 2007-239655 A
Patent Document 2: JP 9-104259 A
Patent Document 3: JP 2006-177171 A
Patent Document 4: JP 2010-209735 A
Non Patent Document 1: "Development of Power-Assisted Turbocharger "Hybrid Turbo"", IBARAKI Seiichi and four others, Mitsubishi Heavy Industries Technical Review, Vol. 43, No. 3, 2006, p. 36-40

In recent years, for improving vehicle fuel efficiency and reducing $CO_2$ emission, the development of technology has been actively made to reduce an engine displacement (engine downsizing) and ensure power performance in a supercharger such as a turbocharger.

However, if an engine displacement is reduced by engine downsizing, there is a problem in that a braking force of a compression release brake is reduced.

In order to increase the braking force of the compression release brake, a compressive pressure is made to increase in a compression process. In order to increase the compressive pressure, increasing a supercharging pressure (boost pressure) may be considered. However, fuel injection to generate a torque is impossible during engine braking, and there is a limit to an increase in exhaust energy. Thus, there is a limit to an increase in the boost pressure by the turbocharger.

SUMMARY OF THE INVENTION

Therefore, an object of the present invention is to solve the above problems and provide an engine system capable of ensuring a sufficient boost pressure during engine braking and improving a braking force of a compression release brake.

The present invention has been made in order to achieve the above object and provides an engine system including: a compression release brake device that operates a compression release brake to obtain a braking force during engine braking by forcibly opening an exhaust valve and releasing a compressive pressure near a compression top dead center of an engine; a power-assisted turbocharger including a turbine disposed on an exhaust passage of the engine and driven by exhaust, a compressor disposed on an intake passage and driven by a rotational torque of the turbine, and an electric motor that assists a drive force of the compressor; and an electric motor control unit that drives the electric motor when the compressor release brake is operated.

The electric motor control unit may be configured to drive the electric motor when the compression release brake is operated and a variation of an accelerator opening degree in an accelerator return direction is greater than a preset threshold value.

The electric motor control unit may be configured to drive the electric motor at a rotational speed corresponding to a variation of an accelerator opening degree in an accelerator return direction.

According to the present invention, it is possible to provide an engine system capable of ensuring a sufficient boost pressure during engine braking and improving a braking force of a compression release brake.

Hereinafter, embodiments of the present invention will be described with reference to the accompanying drawings.

Figure 1:
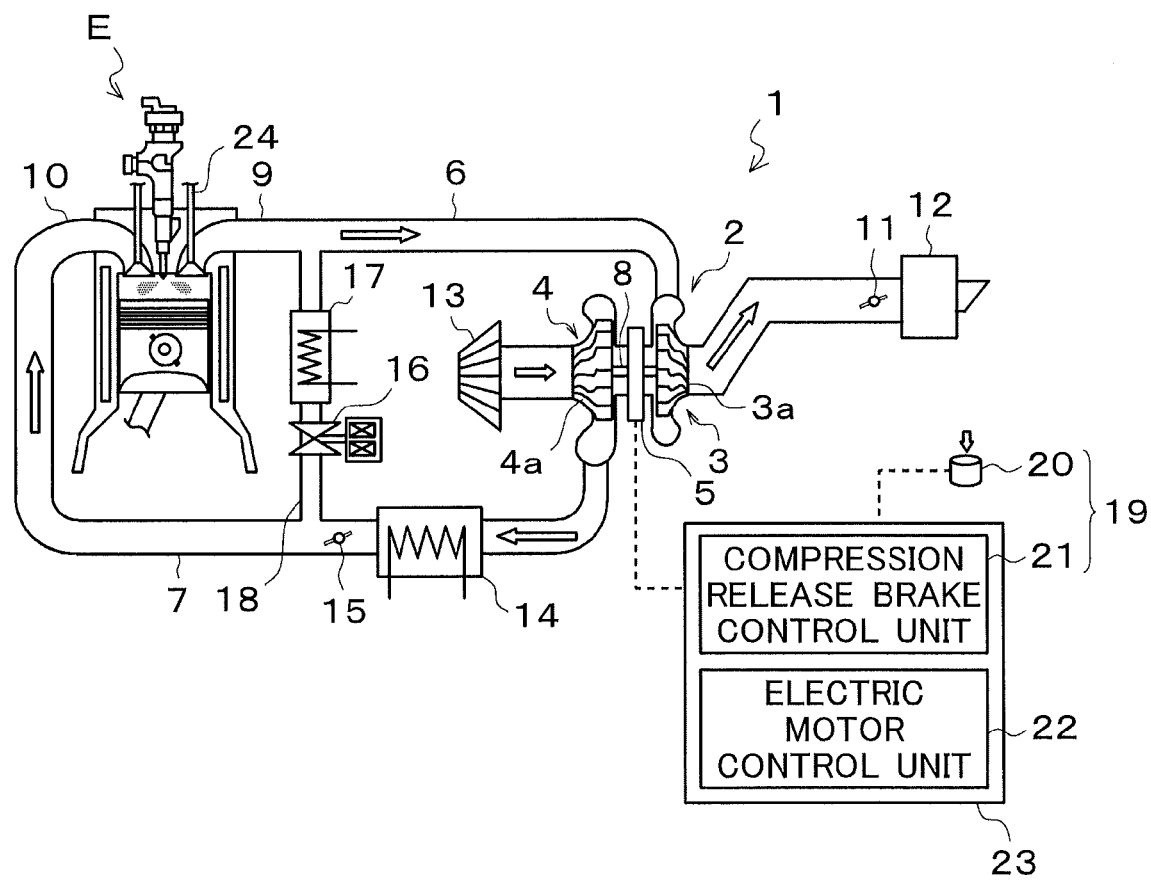
FIG. 1 is a schematic configuration diagram of an engine system according to an embodiment of the present invention.

FIG. 1 is a schematic configuration diagram of an engine system according to an embodiment of the present invention.

As illustrated in FIG. 1, the engine system 1 is provided with a power-assisted turbocharger (hybrid turbo) 2 including a turbine 3 disposed on an exhaust passage 6 of an engine E and driven by exhaust, a compressor 4 disposed on an intake passage 7 and driven by a rotational torque of the turbine 3, and an electric motor 5 that assists a drive force of the compressor 4 (assists the rotational torque of the turbine 3).

The electric motor 5 of the power-assisted turbocharger 2 is integrally provided with a turbo shaft 8 that connects the turbine 3 and the compressor 4, more particularly, a turbine wheel 3a of the turbine 3 and a compressor wheel 4a of the compressor 4. The electric motor 5 is provided with, for example, a DC servomotor. Further, since the electric motor 5 is integrally provided with the turbo shaft 8, a rotational speed of the electric motor 5 is equal to a rotational speed (turbo rotational speed) of the power-assisted turbocharger 2. Since a detailed configuration of the power-assisted turbocharger 2 belongs to the prior art, a description thereof will be omitted herein. Hereinafter, the power-assisted turbocharger 2 will be simply referred to as the turbocharger 2.

The most upstream of the exhaust passage 6 is connected to an exhaust manifold 9 of the engine E. In the exhaust passage 6 of the downstream side, the turbine 3 of the turbocharger 2, an exhaust throttle 11, and an exhaust gas purifier 12 are sequentially provided. The most downstream of the exhaust passage 6 is opened to the atmosphere.

In the most upstream of the intake passage 7, an air filter 13 is provided. In the intake passage 7 of the downstream side, the compressor 4 of the turbocharger 2, an intercooler (charge air cooler) 14, and an air supply throttle 15 are sequentially provided. The most downstream of the intake passage 7 is connected to an intake manifold 10 of the engine E.

Further, the engine system 1 performs exhaust gas recirculation ("EGR") control such that a part of exhaust gas discharged from the engine E is recirculated to the intake side. Specifically, an EGR pipe 18 is provided to connect the exhaust passage 6 of the upstream side of the turbine 3 and the intake passage 7 of the downstream side of the air supply throttle 15. The EGR pipe 18 is provided with an EGR valve 16 for adjusting an EGR amount (or EGR rate), which is an amount of exhaust gas recirculated to the intake side, and an EGR cooler 17 for cooling the exhaust gas recirculated to the intake side, respectively.

Furthermore, the engine system 1 is provided with a compression release brake device 19 that obtains a braking force during engine braking by forcibly opening an exhaust valve 24 and releasing a compressive pressure near a compression top dead center of the engine E. The compression release brake device 19 is provided with a changing-over switch 20 that switches on/off whether to operate the compression release brake, and a compression release brake control unit 21 that forcibly opens the exhaust valve 24 near the compression top dead center during engine braking when the changing-over switch 20 is on.

Furthermore, the engine system 1 is provided with an electric motor control unit 22 that drives the electric motor 5 during the operation of the compression release brake. The compression release brake control unit 21 and the electric motor control unit 22 are embedded into an electronic control unit (ECU) 23 as a program. Further, in the ECU 23, all engine parameters, such as an engine speed or a fuel injection amount, an accelerator opening degree, or the like, are recognized so as to perform the control of the engine E.

The electric motor control unit 22 is configured to drive the electric motor 5 when the compression release brake is operated and a variation of the accelerator opening degree in an accelerator return direction is greater than a preset threshold value. That is, in the engine system 1, when an accelerator return amount is small, only the compression release brake is operated without driving the electric motor 5, and only when the accelerator return amount is large, the electric motor 5 is driven to improve the braking force of the compression release brake.

Further, the electric motor control unit 22 is configured to drive the electric motor 5 at a rotational speed corresponding to the variation of the accelerator opening degree in the accelerator return direction. In this way, it is possible to adjust an amount of air supplied to the engine E during the operation of the compression release brake and adjust the braking force of the compression release brake, and it is possible to increase the braking force as the accelerator return amount is larger.

Figure 2:
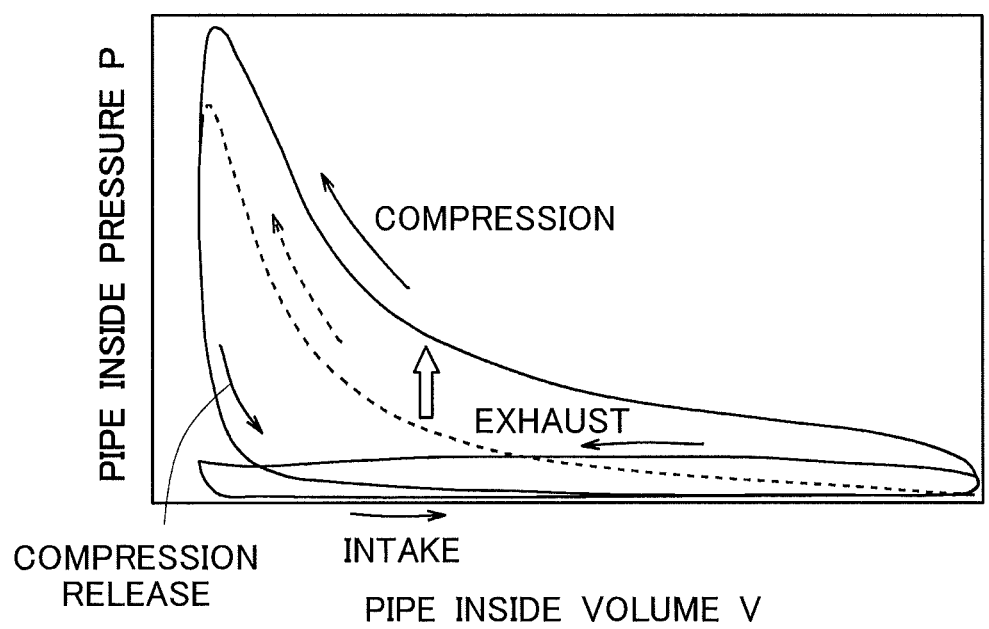
FIG. 2 is a PV diagram when a compression release brake is operated in the engine system of FIG. 1.

As indicated by a solid line in FIG. 2, when the electric motor 5 is driven during the operation of the compression release brake, the boost pressure is increased and the pressure at the beginning of the compression process is increased. As a result, the pressure at the end of the compression process is also increased. As compared with a case (dashed line) where the electric motor 5 is not driven, a counterclockwise loop area, that is, a negative amount of work (braking force) is increased. Since the counterclockwise loop area can be controlled by the boost pressure, a desired braking force can be obtained by controlling a driving amount of the electric motor 5 (for example, by controlling a magnitude of a voltage applied to the electric motor 5).

As described above, the engine system 1 according to the embodiment uses the power-assisted turbocharger 2 including the electric motor 5, and drives the electric motor 5 during the operation of the compression release brake.

Since no fuel is injected during the engine braking, the exhaust energy is reduced and thus the turbo rotational speed is also reduced. However, according to the present invention, by driving the electric motor 5, the boost pressure is increased during the engine braking, and the braking force of the compression release brake is improved. Thus, a strong braking force can be obtained.

Further, according to the present invention, since a sufficient braking force can be obtained even when an engine displacement is reduced, further engine downsizing is enabled and the fuel efficiency can be further improved.

Furthermore, in the engine system 1, the electric motor 5 is driven when the compression release brake is operated and the variation of the accelerator opening degree in the accelerator return direction is greater than a preset threshold value, and the electric motor 5 is driven at the rotational speed corresponding to the variation of the accelerator opening degree in the accelerator return direction.

In the conventional engine system, in a case where a long downhill road is followed by an expressway or an interrupt frequently occurs, if the changing-over switch 20 is switched on (mode using the compression release brake) for safety, there occurs a problem in that the braking force is excessively increased, the amount of stepping on the accelerator increases in reverse, and the fuel efficiency is deteriorated. However, according to the present invention, such a problem can be solved since the braking force can be adjusted according to the accelerator return amount. For example, the above problem can be solved and the improvement of the fuel efficiency can be achieved in such a manner that the braking force when operating only the compression release brake is set to be lower than the current state by the engine downsizing, and the braking force equal to or greater than the braking force of the current state is obtained by the assist of the electric motor 5 when the accelerator return amount is large.

Further, in the power-assisted turbocharger 2, when the exhaust energy is sufficient, regenerative power can also be obtained by using the electric motor 5 as a generator.

It is apparent that the present invention is not limited to the embodiment, and various modifications can be made without departing from the scope of the present invention.

The invention claimed is:

1. An engine system, comprising:
 a compression release brake device that operates a compression release brake to obtain a braking force during engine braking by forcibly opening an exhaust valve and releasing a compressive pressure near a compression top dead center of the engine;
 a power-assisted turbocharger including a turbine disposed on an exhaust passage of the engine and driven by exhaust, a compressor disposed on an intake passage and driven by a rotational torque of the turbine, and an electric motor that assists a drive force of the compressor; and
 an electric motor control unit that drives the electric motor when the compression release brake is operated,
 wherein the electric motor control unit is configured to drive the electric motor when the compression release brake is operated and a variation of an accelerator opening degree in an accelerator return direction is greater than a preset threshold value.

2. The engine system according to claim 1, wherein the electric motor control unit is configured to drive the electric motor at a rotational speed corresponding to a variation of an accelerator opening degree in an accelerator return direction.

3. An engine system, comprising:
- a compression release brake device that operates a compression release brake to obtain a braking force during engine braking by forcibly opening an exhaust valve and releasing a compressive pressure near a compression top dead center of the engine;
- a power-assisted turbocharger including a turbine disposed on an exhaust passage of the engine and driven by exhaust, a compressor disposed on an intake passage and driven by a rotational torque of the turbine, and an electric motor that assists a drive force of the compressor; and
- an electric motor control unit that drives the electric motor when the compression release brake is operated,
- wherein the electric motor control unit is configured to drive the electric motor at a rotational speed corresponding to a variation of an accelerator opening degree in an accelerator return direction.

\* \* \* \* \*